United States Patent
Bates et al.

(10) Patent No.: US 8,484,412 B2
(45) Date of Patent: Jul. 9, 2013

(54) POWER MODE OPERATION OF A MAGNETIC TAPE DRIVE

(75) Inventors: Allen Keith Bates, Tucson, AZ (US); Steven Ross Bentley, Tucson, AZ (US); Randall Scot Doan, Tucson, AZ (US); Katsuhiko Hagiwara, Yamato (JP); Fahnmusa Christian Jangaba, Tucson, AZ (US); Christine Renee Knibloe, Tucson, AZ (US); Hisato Matsuo, Kanagawa (JP); Hirokazu Nakayama, Kanagawa (JP); Mitsuhiro Nishida, Kanagawa (JP); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 12/613,259

(22) Filed: Nov. 5, 2009

(65) Prior Publication Data

US 2011/0102938 A1    May 5, 2011

(51) Int. Cl.
*G06F 12/00* (2006.01)
*G06F 13/00* (2006.01)
*G06F 13/28* (2006.01)

(52) U.S. Cl.
USPC ........... 711/111; 713/300; 713/323; 713/324; 360/69

(58) Field of Classification Search
USPC .............. 711/111; 713/300, 323, 324; 360/69
See application file for complete search history.

(56) References Cited

U.S. PATENT DOCUMENTS

| 4,737,867 | A | | 4/1988 | Ishikawa et al. | 360/69 |
|---|---|---|---|---|---|
| 5,953,174 | A | * | 9/1999 | Satou et al. | 360/69 |
| 7,177,108 | B2 | * | 2/2007 | Payne et al. | 360/69 |
| 7,809,252 | B2 | * | 10/2010 | Lai et al. | 386/353 |
| 7,870,409 | B2 | * | 1/2011 | Murase | 713/324 |
| 2006/0010275 | A1 | | 1/2006 | Moon et al. | 710/302 |
| 2009/0207520 | A1 | * | 8/2009 | Golasky et al. | 360/69 |

* cited by examiner

*Primary Examiner* — Stephen Elmore
*Assistant Examiner* — Mark Giardino, Jr.
(74) *Attorney, Agent, or Firm* — John H. Holcombe

(57) ABSTRACT

A magnetic tape drive having a tape drive system for moving magnetic tape, tape read/write and servo system, tape cartridge load/unload systems, I/O communications, memory; and a control system, operates in three modes to conserve energy consumption. A first low power mode powers the I/O communications, the memory, and the control system. If a magnetic tape cartridge is in loaded position in the magnetic tape drive, the second low power mode powers the same as the first low power mode, and additionally powers the tape drive system to apply tension to a magnetic tape of the magnetic tape cartridge. In the first and the second low power modes, the control system operates the I/O communications, the memory and the control system to respond to and execute commands received at the I/O communications if the commands are executable without magnetic tape access. The third, full power mode, is entered if a command received at the I/O communications requires magnetic tape access.

6 Claims, 4 Drawing Sheets

POWER MODE OPERATION OF A MAGNETIC TAPE DRIVE

FIELD OF THE INVENTION

This invention relates to magnetic tape drives, and more particularly to power consumption by magnetic tape drives.

BACKGROUND OF THE INVENTION

Magnetic tape drives are electro-mechanical devices comprising, for example I/O (input/output) communications, memory, control system, tape drive system for moving magnetic tape, tape read/write and servo system, and tape cartridge load/unload system. Thus, magnetic tape drives tend to have significant power consumption during operation.

SUMMARY OF THE INVENTION

Methods, control and I/O (input/output) systems, and magnetic tape drives are arranged to control the consumption of power.

In one embodiment, a magnetic tape drive comprises a tape drive system for moving magnetic tape, tape read/write and servo system, tape cartridge load/unload systems, I/O communications, memory; and a control system configured to:

operate the magnetic tape drive in a first low power mode if the magnetic tape drive is empty, the first low power mode comprising powering the I/O communications, the memory, and the control system;

operate the magnetic tape drive in a second low power mode if a magnetic tape cartridge is in loaded position in the magnetic tape drive, the second low power mode the same as the first low power mode, and additionally powering the tape drive system to apply tension to a magnetic tape of the magnetic tape cartridge;

in the first and the second low power modes, the control system operates the I/O communications, the memory and the control system to respond to and execute commands received at the I/O communications if the commands are executable without magnetic tape access; and operate the magnetic tape drive in a full power mode, if a command received at the I/O communications requires magnetic tape access.

In a further embodiment, the control system is configured to operate the magnetic tape drive in the low power modes to respond to the received commands in a manner to emulate an active magnetic tape drive.

In a still further embodiment, the commands that are executable without requiring magnetic tape access comprise commands relating to data stored in the memory, to data that may be stored in the memory, and relating to status of the magnetic tape drive.

In another embodiment, the control system configured to:
operate the magnetic tape drive in low power modes:
 i. if the magnetic tape drive is empty, operate the magnetic tape drive in a first low power mode comprising powering the I/O communications, the memory, and the control system;
 ii. if a magnetic tape cartridge is in loaded position in the magnetic tape drive, operate the magnetic tape drive in a second low power mode, the second low power mode the same as the first low power mode, and additionally power the tape drive system to apply tension to a magnetic tape of the magnetic tape cartridge;

analyze commands received by the I/O communications when the magnetic tape drive is in one of the low power modes;

determine whether at least one the received command relates to at least one of data stored in the memory, data that may be stored in the memory, and status of the magnetic tape drive;

if so, execute the at least one command without powering on the remainder of the magnetic tape drive; and if the command relates to at least one of data stored on a magnetic tape cartridge, to data that may be stored in the memory and exceeds the capacity of the memory, and to action requiring movement of a magnetic tape, power on the magnetic tape drive.

In a further embodiment, the control system is configured to, in the low power modes, power off portions of the control system that are used with or that control functions of the magnetic tape drive that are powered off.

In another embodiment, the control system is configured, when the magnetic tape drive is fully powered, if a magnetic tape cartridge is loaded but there is no tape movement for a predetermined time, to power down to the second low power mode.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
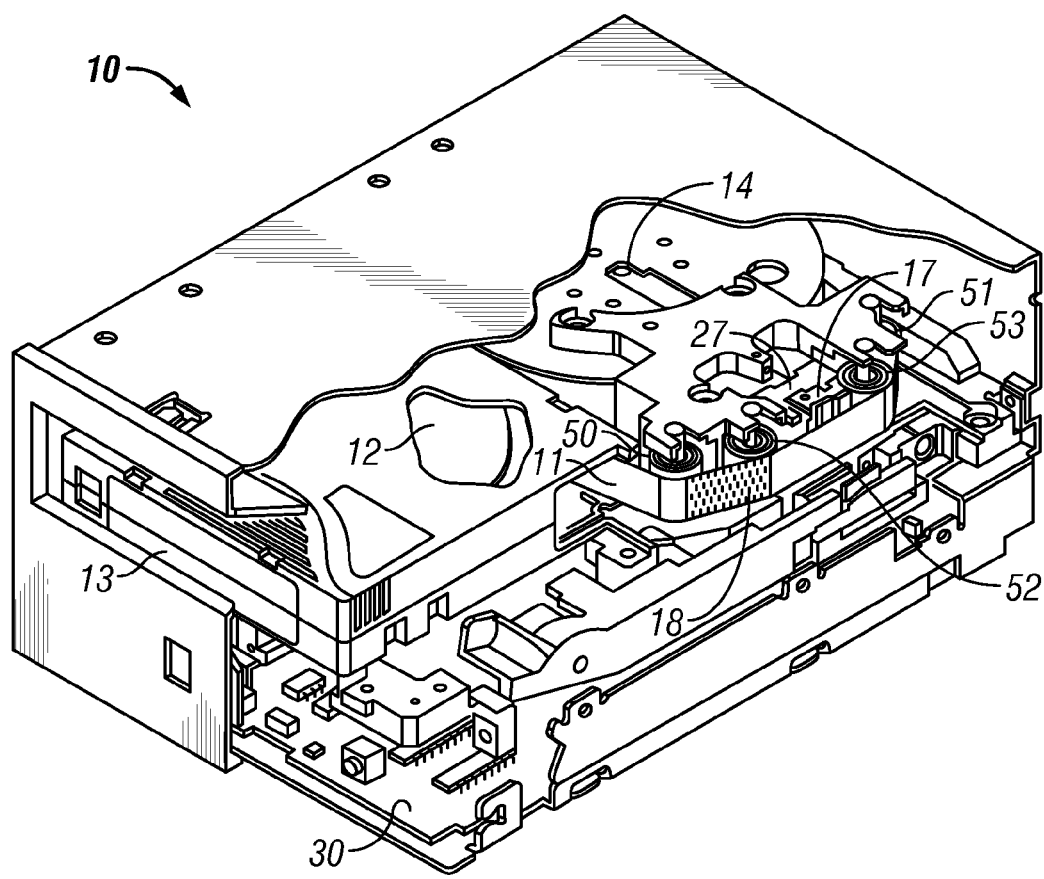
FIG. 1 is a partially cut away view of an exemplary magnetic tape data storage drive which may implement aspects of the present invention.
Figure 2:
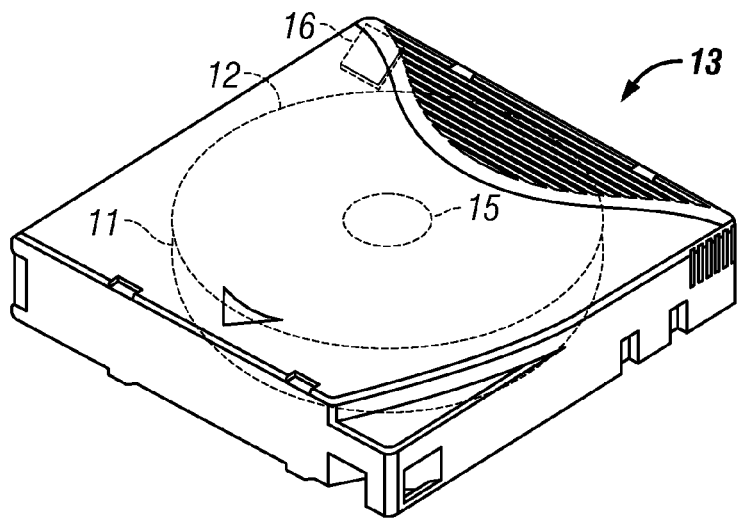
FIG. 2 is an isometric view of a removable data storage cartridge with a media, such as magnetic tape, and with a cartridge memory shown in phantom.
Figure 3:
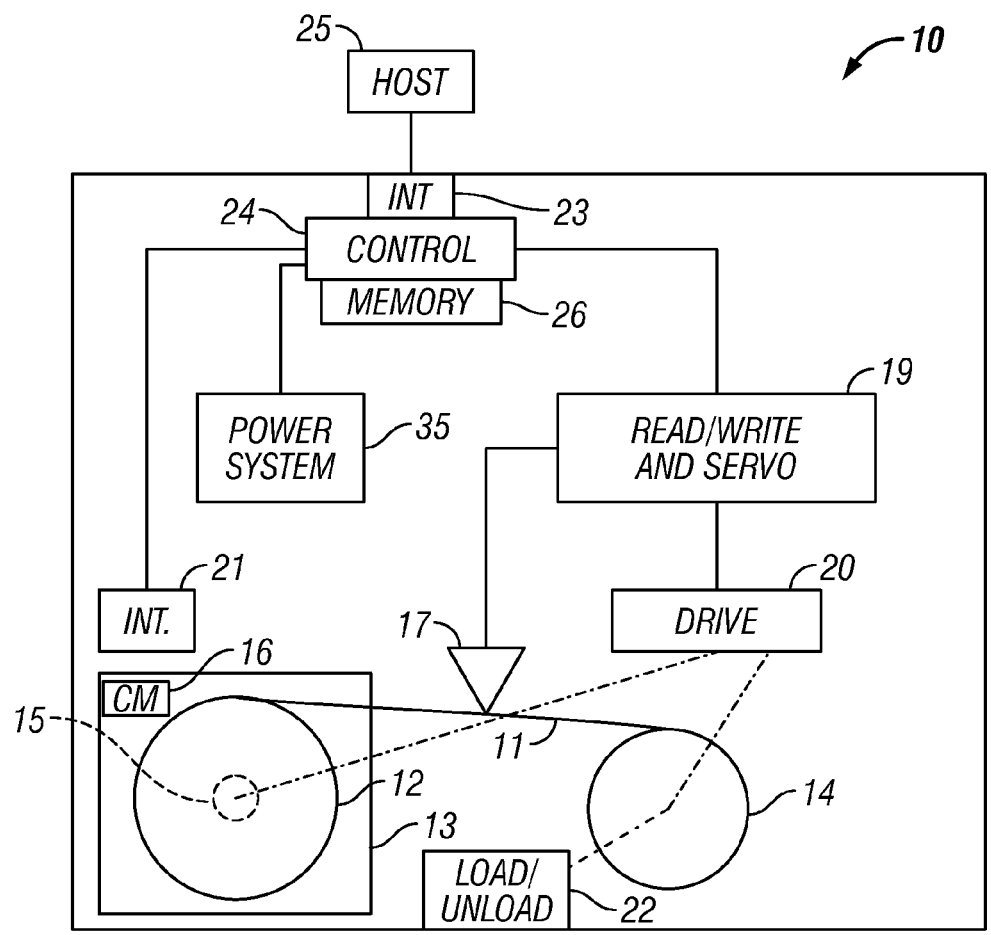
FIG. 3 is a block diagrammatic representation of the magnetic tape data storage drive of FIG. 1.

FIGS. 1, 2 and 3, illustrate an example of a magnetic tape data storage drive 10 and an example of a magnetic tape cartridge 13.

The magnetic tape data storage drive 10 is arranged to write data 18 to and read data from longitudinal tape comprising magnetic tape data storage media 11. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in magnetic tape data storage cartridge 13 to a take up reel 14. An example of a magnetic tape drive is the IBM® LTO (Linear Tape Open)

magnetic tape drive, such as the IBM® Ultra 160 or Ultra 320 magnetic tape drive. Another example of a magnetic tape drive is the IBM® 3592 TotalStorage TS 1130 Enterprise magnetic tape drive. The above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape data storage cartridge 13 comprises rewritable or write-once, read many (WORM) magnetic tape 11 wound on a hub 15 of reel 12, and a cartridge memory 16. The cartridge memory 16, for example, comprises a transponder having a contactless interface, which is retained in the cartridge 13, for example, by being encapsulated by the cartridge when it is assembled, as is understood by those of skill in the art. Alternatively, the cartridge memory 16 has a Universal Serial Bus (USB) interface with magnetic tape data storage drive 10.

The magnetic tape drive comprises a memory interface 21 for reading information from, and writing information to, the cartridge memory 16 of the magnetic tape cartridge 13. A read/write system is provided for reading and writing information to the magnetic tape, and, for example, may comprise a read/write and servo tape head 17 with a servo system for moving the tape head 17 laterally of the magnetic tape 11, a read/write and servo system 19, and a drive system 20 which moves the magnetic tape 11 between the cartridge reel 12 and the take up reel 14 and across the read/write and servo tape head 17. The magnetic tape media is supported by roller tape guides 50, 51, 52, 53, while the magnetic tape media is moved longitudinally.

A typical magnetic tape data storage drive operates in both the forward and reverse directions to read and write data. Thus, the magnetic tape head 17 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions. The servo read elements operate in either direction of tape movement. The read/write and servo system 19 controls the operation of the drive system 20 to move the magnetic tape 11 across the tape head 17 at a desired velocity, and, in one example, determines the lateral location of the tape head with respect to the magnetic tape 11 and operates actuator 27 to laterally position the head 17. In one example, the tape head 17 is supported and laterally moved by a compound actuator 27 of a track following servo system. In one example, the read/write and servo tape head 17 and read/write and servo system 19 employ longitudinal address information embedded in the servo signals on the magnetic tape 11 to determine the longitudinal location of the read/write and servo tape head, and in another example, the read/write and servo system 19 employs at least one of the reels, such as by means of a tachometer, to determine the longitudinal location of the read/write and servo tape head with respect to the magnetic tape 11. The read/write and servo tape head 17 and read/write and servo control 19 may comprise hardware elements and may comprise any suitable form of logic, including a processor operated by software, or microcode, or firmware, or may comprise hardware logic, or a combination.

A tape load/unload system 22 may access a leader block from the magnetic tape cartridge 13 and position the leader block at the reel 14, while positioning the magnetic tape 11 across roller tape guides 50, 51, 52, 53, and tape head 17. For example, a tape threading mechanism may move the free end of the magnetic tape 11 from the magnetic tape cartridge 13 to reel 14, for example, positioning the free end leader block at the central axis of the reel 14. The magnetic tape is thus positioned along the tape path. Similarly, the tape load/unload system 22 may access the leader block at reel 14 and reposition it back at the cartridge 13 to allow removal of the cartridge from the tape drive 10.

An interface 23 provides communication with respect to one or more host systems 25, and is configured to receive and to send information externally of the data storage drive. Alternatively, the magnetic tape drive 10 may form part of a subsystem, such as a library, and may also receive commands from the subsystem, also at interface 23.

A control 24 communicates with the host interface 23, with memory 26, with cartridge interface 21, and communicates with the read/write system, e.g., at read/write and servo control 19. The control 24 may comprise any suitable form of logic, including one or more processors operated by software, or microcode, or firmware, or may comprise hardware logic, or a combination.

The control 24 typically communicates with the one or more external or host systems 25 via interface 23, and operates the magnetic tape drive 15 in accordance with commands originating at the host. The external or host system may comprise a network, a host processor or system, a data storage library or automation system, a data storage subsystem, etc., as is known to those of skill in the art. Data and commands may be stored in memory 26 by control 24 for communication with the host systems and for communication with the read/write system for storage and retrieval from the magnetic tape. The memory 26 may also serve as a buffer for the data.

The control 24 is configured to operate the magnetic tape data storage drive in accordance with commands received from the host system 25. A control typically comprises logic and/or one or more microprocessors with a processor memory or employ memory 26 for storing information and program information for operating the microprocessor(s) and drive. The program information may be supplied to the memory via the interface 23, by an input to the control 24 such as a floppy or optical disk, or by reading from a magnetic tape cartridge, or by any other suitable means. The control 24 also provides the data flow and formatter for data to be read from and written to the magnetic tape media, as is known to those of skill in the art.

The electronics for the interface 23, control 24, memory 26, read/write and servo system 19, interface 21, drive system 20 and load/unload system 22 may be mounted on one or more circuit boards 30.

The read/write and servo system 19, drive system 20, and load/unload system 22 comprise many elements, including both electronic drivers and servo motors and servo actuators, separately powered by power system 35. For example, referring to FIGS. 3 and 4, read/write and servo system 19 comprises servo detection system 40 for reading servo tracks of the magnetic tape 11 from tape head 17 and determining both the lateral and longitudinal positions of the magnetic tape. The read/write and servo system 19 further comprises track following actuator 27 operated by servo control 41 in response to servo detection system 40 to position the tape head 17 laterally with respect to the magnetic tape and follow a selected servo track(s). The motor control 44 operates the drive 20 to rotate the tape reels 12 and 14 to move the tape longitudinally with respect to the tape head 17 at a desired speed. As the tape head follows the selected servo track(s) of the longitudinally moving tape, the data read/write channels 45 read and write data to the magnetic tape. As another example, referring to FIGS. 3 and 5, drive 20 comprises motors 55 to rotate reels 12 and 14 in accordance with drive currents from motor drivers 56 under the control of the read/write and servo system 19. The motor drivers apply the appropriate currents to the motors 55 to both move the magnetic tape 11 longitudinally and to also create the appropriate amount of tension to the magnetic tape, either while the magnetic tape is moving or when the tape is stopped and tension is applied. The tension is to prevent the tape from drooping or moving to a position where it may potentially be stressed once the tape is again moved longitudinally. An example is if the tape would droop off an edge of the tape head 17 or tape guide 50, 51, 52, 53. Drive sensors 58 can measure the current and therefore both the rotational speed and the tension of the motors 55, which information comprises feedback used by the read/write and servo control and/or the motor drivers 56.

Figure 4:
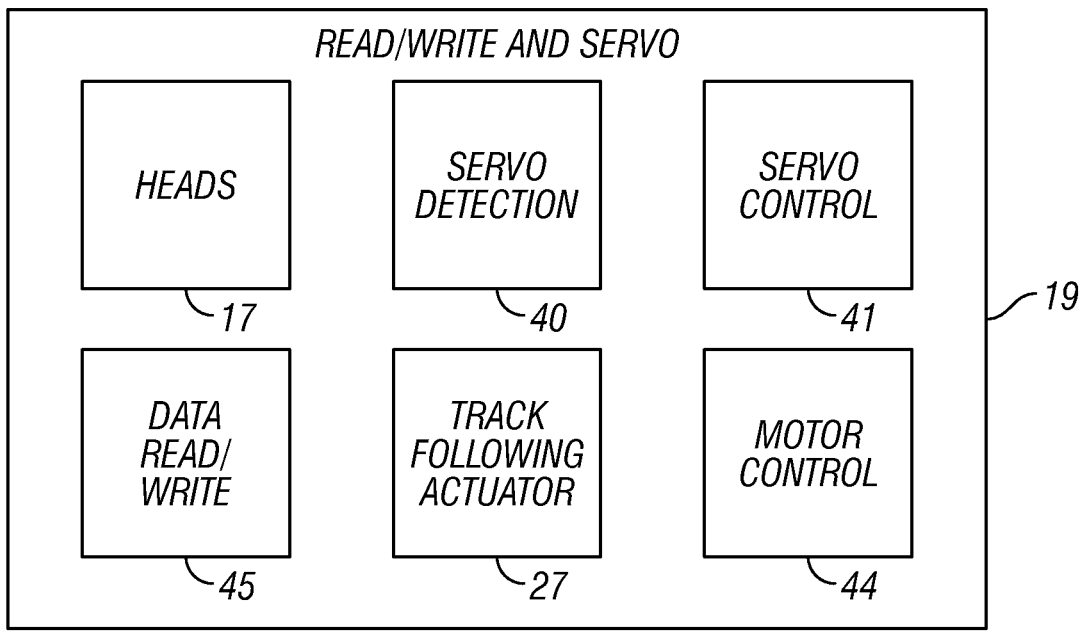
FIG. 4 is a block diagrammatic representation of the read/write and servo system of FIG. 3.
Figure 5:
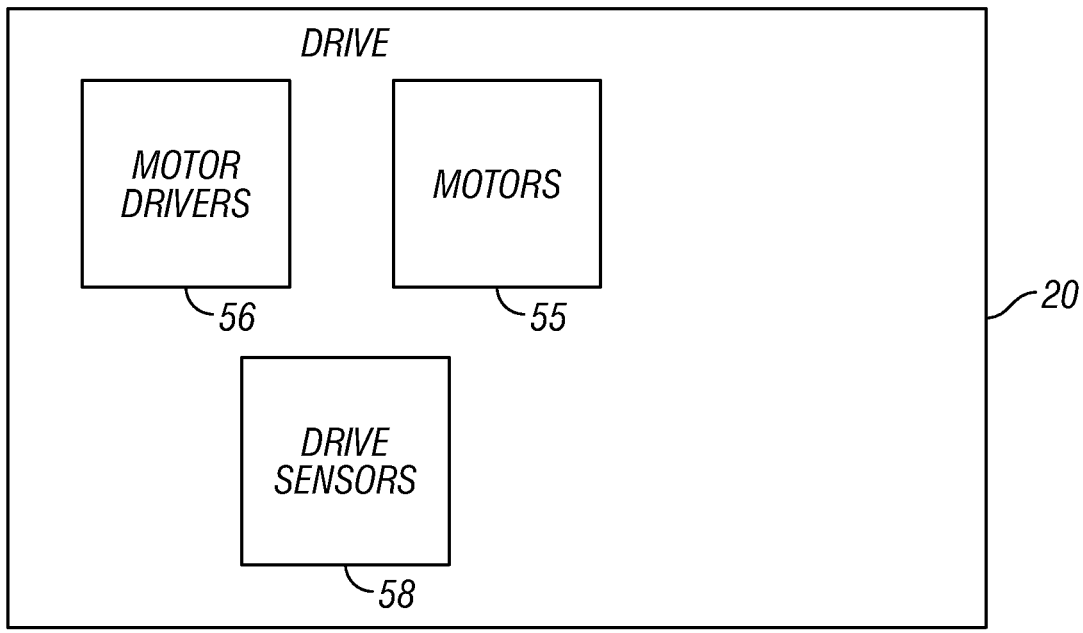
FIG. 5 is a block diagrammatic representation of the drive system of FIG. 3.

Referring to FIGS. 3, 4 and 5, alternative arrangements of the read/write and servo system 19 and drive system 20 are known to those of skill in the art. In the present invention, various components are separately powered by the power system 35.

Figure 6:
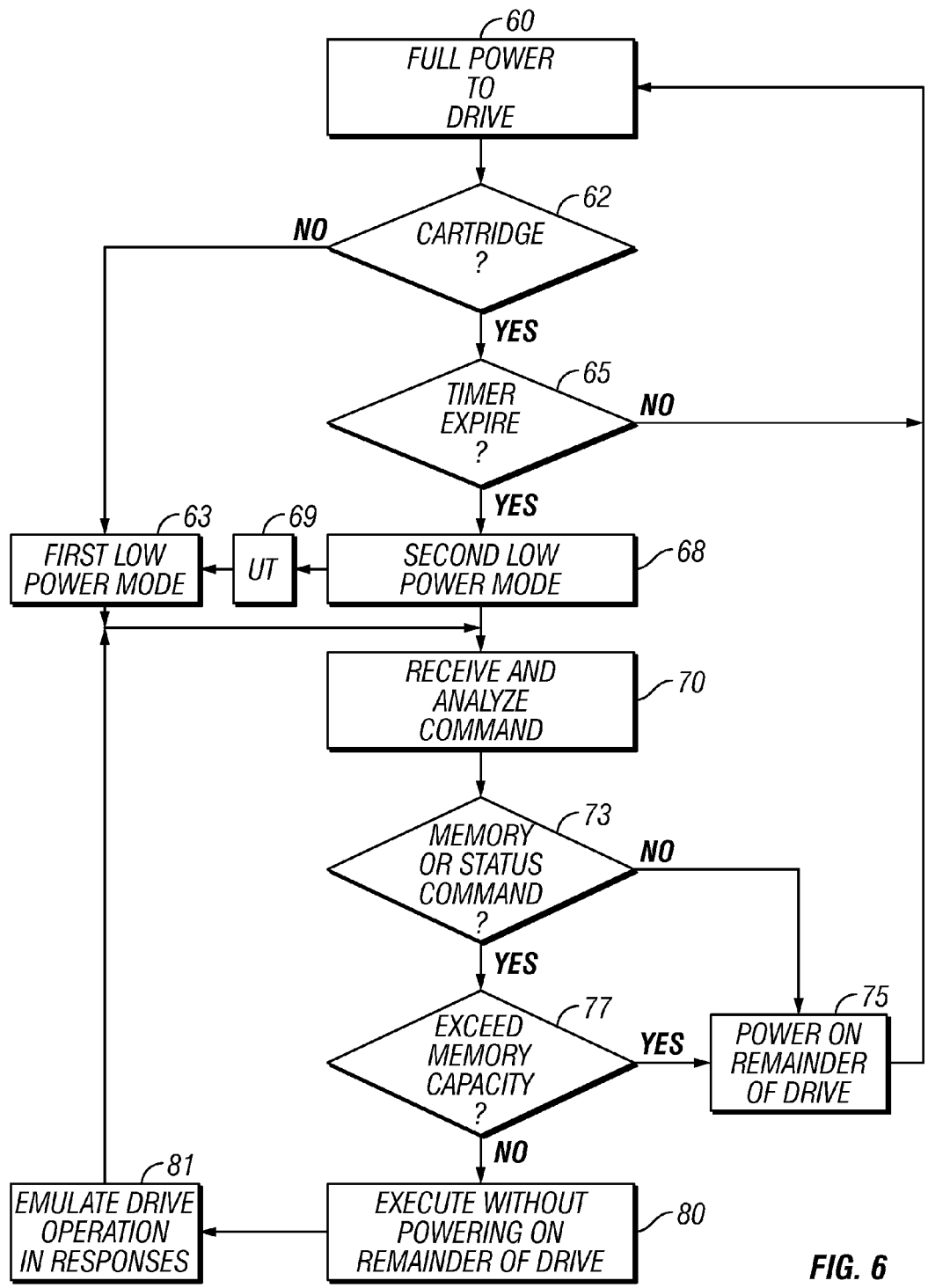
FIG. 6 is a flow chart depicting an exemplary method of operating the system of FIGS. 1 and 3.

Referring additionally to FIG. 6, at step 60, the magnetic tape data storage drive 10 is in the full power state, meaning that power is supplied to all aspects of the drive, not that all aspects of the drive are currently operating with full power. For example, in the full power state, it is possible to power off the load/unload system 22 except when a cartridge 13 is being loaded or unloaded. Further, the tape 11 may be held stationary for periods of time, or held in an unthreaded position within the cartridge 13 for periods of time. Thus, the magnetic tape drive 10 is sufficiently powered in the full power state that all motor and servo drivers are ready to operate the associated motors and servos.

In the full power state, a cartridge 13 may or may not be in the loaded position within the drive. Step 62 determines whether a cartridge is in the drive or is being loaded into the drive or unloaded from the drive.

If there is no cartridge and any cartridge has been unloaded, such that the magnetic tape drive 10 is empty per step 62, the control 24 operates the power system 35 to place the drive in a first low power mode in step 63. The first low power mode comprises powering the I/O communications 23, the memory 26, and the control system 24.

In step 63, power system 35 may be operated to power down or power off the read/write and servo system 19, the drive system 20, and the load/unload system 22. With the cartridge absent, interface 21 to a cartridge memory may also be powered off. Portions of the control 24 that are used with or control the functions of the drive 10 that are powered off may themselves be powered off by the power system 35 or by functions within the control system 24.

If step 62 indicates that a magnetic tape data storage cartridge 13 is present in loaded position in the drive 10, commands may be received to perform operations with respect to the cartridge, and the full power state of the drive assures that the drive is capable from a power standpoint to execute the commands. For example, the commands may comprise reading or writing data with respect to the magnetic tape 11, buffering or temporarily storing the data in memory 26, and communicating the data over I/O communications 23. The transfer of data may also require updating of the cartridge memory 16 via interface 21. The received commands may also relate to data previously stored in the memory 26, to storing data in the memory, and relating to status of the magnetic tape drive. Still further, the received commands may relate to rewinding the magnetic tape 11 onto the magnetic tape cartridge 13 and unloading the cartridge, leading back to steps 62 and 63.

If the commands continue to keep the drive 10 active, a timer of control 24 will not expire in step 65, and the full power state is maintained at the magnetic tape drive in step 60. If the drive 10 is inactive for a predetermined period of time while a magnetic tape cartridge is loaded in the magnetic tape drive, the timer of control 24 may expire in step 65, leading to step 68 comprising a second low power mode. An example, of a predetermined time comprises a time period of ten minutes.

The second low power mode 68 is the same as the first low power mode 63, and additionally powers the tape drive system to apply tension to the magnetic tape 11 of the magnetic tape cartridge 13. For example, the power system additionally powers the motor control 44 of the read/write and servo system 19 to operate the drive system 20 to apply tension to the magnetic tape without longitudinally moving the tape. Thus, small currents are applied by drivers 56 to operate the motors 55 to apply tension in opposite directions to the magnetic tape 11.

In an alternative embodiment, instead of the second low power mode 68 with the magnetic tape cartridge 13 in place, the magnetic tape 11 is unthreaded in step 69. When unthreaded, tension is no longer applied to the magnetic tape and results in substantially the same power consumption as the first low power mode 63. However, the magnetic tape will have to be rethreaded when the magnetic tape becomes active.

While in the first low power mode 63 or the second low power mode 68, the powering and operation of the I/O communications 23 and control 24 allow the magnetic tape drive 10 to continue to receive commands in step 70, such that the host system 25 may have no indication that the drive 10 is in a low power mode and reducing consumption of power during operation. However, as discussed above, the control 24 may operate the power system 35 or provide functions within the control system, in one of the low power modes, to power off portions of the control system that are used with or control functions of the magnetic tape drive that are powered off. For example, blocks within the control or partial blocks of the control 24 may be powered down. Additionally, the memory 26 may be operated in a low power mode, or in a self-refresh mode, or if it is modular, some module(s) may be powered off.

In step 70, the control 24 analyzes the received commands to determine whether they are executable without requiring magnetic tape access, comprising, for example, commands relating to data previously stored in the memory 26, to storing data in the memory, and relating to status of the magnetic tape drive 10. The commands may not explicitly indicate that they relate to data stored in the memory, or to storing data in the memory. Rather, the memory may retain data previously buffered in the memory and which is retained in the memory, and the current command may again relate to that data. Data may be entered into the memory 26 either as an update to data existing in the memory, or may comprise an addition or update to data that is sufficiently small in extent that it can fit within the capacity of the memory to be provided to the magnetic tape at a future time. In order to be data as discussed above, the cartridge relating to that data should be present in the magnetic tape drive 10 rather than attempt to reload a cartridge 13 that had been unloaded. Thus, in such a case, the drive 10 is likely to be in the second low power mode 68.

If in step 73, the analysis of step 70 indicates that the command is one that relates to at least one of data stored on a magnetic tape cartridge, and to action requiring movement of a magnetic tape, the magnetic tape drive 10 is powered on in step 75 and the process returns to step 60. If step 73 indicates that the commands are executable without requiring magnetic tape access, comprising, for example, commands relating to data stored in the memory 26, to storing data in the memory, and relating to status of the magnetic tape drive 10, step 77 determines whether a data processing command results in data that may be stored in the memory 26 exceeding the capacity of the memory. If the capacity of the memory 26 will be exceeded, step 75 powers on the magnetic tape drive 10 and returns to step 60. Powering on the magnetic tape drive may additionally require rethreading the magnetic tape 11, unthreaded in step 69.

If, however, steps 73 and 77 indicate that the received command(s) relates to at least one of data stored in the memory, data that may be stored in the memory, and status of the magnetic tape drive, and that data that may be stored in the memory will not exceed the capacity of said memory, such that no action requiring movement of a magnetic tape will be required, the command(s) is executed in step 80 without powering on the remainder of the drive 10, leaving the drive in the first low power mode 63 or the second low power mode 68.

In step 81, the control 24 and I/O communications 23 respond to the received commands in a manner to emulate an active magnetic tape drive, and return to step 70 to receive the next command. In emulating an active magnetic tape drive in step 81, the responses are in the same format and represent the same information as though the drive was fully operational with an exception that a status command inquiring the power status of the drive may indicate whether the drive is in a low power mode and which low power mode.

The steps of FIG. 6 may be altered in sequence or in content while still retaining the functions of the present method.

The implementations may involve software, firmware, micro-code, hardware and/or any combination thereof. The implementation may take the form of code or logic implemented in a medium, such as memory 26, and/or circuitry of control 24 where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk such as compact disk—read only memory [CD-ROM], compact disk—read/write [CD-R/W], digital versatile disk [DVD] and Blu-Ray disk [BD]).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for operating a magnetic tape drive, said magnetic tape drive comprising I/O communications, memory, control system, tape drive system, tape read/write and servo system, and tape cartridge load/unload system, comprising the steps of:

operating said magnetic tape drive in a full power mode if a magnetic tape cartridge is in loaded position in said magnetic tape drive with a magnetic tape threaded into said magnetic tape drive and said magnetic tape drive is active;

operating said magnetic tape drive in a first low power mode if said magnetic tape drive is empty, said first low power mode comprising powering said I/O communications, said memory, and said control system;

if a magnetic tape cartridge is in loaded position in said magnetic tape drive with a magnetic tape threaded into said magnetic tape drive, while in said full power mode, if said magnetic tape drive is inactive for a predetermined period of time, operating said magnetic tape drive in a second low power mode, said second low power mode comprising powering said I/O communications, said memory, and said control system, and additionally powering said tape drive system to apply tension to said magnetic tape of said magnetic tape cartridge without longitudinally moving said magnetic tape;

in said first and said second low power modes, operating said I/O communications, said memory and said control system to respond to and execute commands received at said I/O communications if said commands are executable without magnetic tape access;

analyzing commands received by said I/O communications when said magnetic tape drive is in one of said low power modes;

if said command relates to at least one of data stored on a magnetic tape cartridge, and to action requiring movement of a loaded magnetic tape, powering on said magnetic tape drive to said full power mode;

if said received command relates to at least one of data stored in said memory, to storing data in said memory and results in data that may be stored in said memory being within the capacity of said memory, and to status of said magnetic tape drive; executing said command without powering on the remainder of said magnetic tape drive; and if said received command relates to storing data in said memory and results in data that may be stored in said memory exceeding the capacity of said memory, powering on said magnetic tape drive to said full power mode.

2. The method of claim 1, comprising, in said low power modes, powering off portions of said control system that are used with or control functions of said magnetic tape drive that are powered off.

3. A control and I/O system for a magnetic tape drive, said magnetic tape drive additionally comprising tape drive system, tape read/write and servo system, and tape cartridge load/unload system, said control and I/O system comprising:

I/O communications;

memory; and control system configured to:

operate said magnetic tape drive in a full power mode if a magnetic tape cartridge is in loaded position in said magnetic tape drive with a magnetic tape threaded into said magnetic tape drive and said magnetic tape drive is active;

operate said magnetic tape drive in a first low power mode if said magnetic tape drive is empty, said first low power mode comprising powering said I/O communications, said memory, and said control system;

if a magnetic tape cartridge is in loaded position in said magnetic tape drive with a magnetic tape threaded into said magnetic tape drive, while in said full power mode, if said magnetic tape drive is inactive for a predetermined period of time, operate said magnetic tape drive in a second low power mode, said second low power mode comprising powering said I/O communications, said memory, and said control system, and additionally powering said tape drive system to apply tension to said magnetic tape of said magnetic tape cartridge without longitudinally moving said magnetic tape;

in said first and said second low power modes, operate said I/O communications, said memory and said control system to respond to and execute commands received at said I/O communications if said commands are executable without magnetic tape access;

analyze commands received by said I/O communications when said magnetic tape drive is in one of said low power modes;

if said received command relates to at least one of data stored on a magnetic tape cartridge, and to action requiring movement of a loaded magnetic tape, operate said power system to power on said magnetic tape drive to said full power mode;

if said received command relates to at least one of data stored in said memory, to storing data in said memory and results in data that may be stored in said memory being within the capacity of said memory, and to status of said magnetic tape drive; execute said command without powering on the remainder of said magnetic tape drive; and if said received command relates to storing data in said memory and results in data that may be stored in said memory exceeding the capacity of said memory, power on said magnetic tape drive to said full power mode.

4. The control and I/O system of claim 3, wherein said power system, in said low power modes, powers off portions of said control system that are used with or control functions of said magnetic tape drive that are powered off.

5. A magnetic tape drive comprising:
I/O communications;
memory;
tape drive system;
tape read/write and servo system;
tape cartridge load/unload system; and
control system configured to:
operate said magnetic tape drive in a full power mode if a magnetic tape cartridge is in loaded position in said magnetic tape drive with a magnetic tape threaded into said magnetic tape drive and said magnetic tape drive is active;

operate said magnetic tape drive in a first low power mode if said magnetic tape drive is empty, said first low power mode comprising powering said I/O communications, said memory, and said control system;

if a magnetic tape cartridge is in loaded position in said magnetic tape drive with a magnetic tape threaded into said magnetic tape drive, while in said full power mode, if said magnetic tape drive is inactive for a predetermined period of time, operate said magnetic tape drive in said second low power mode, said second low power mode comprising powering said I/O communications, said memory, and said control system, and additionally power said tape drive system to apply tension to said magnetic tape of said magnetic tape cartridge without longitudinally moving said magnetic tape;

in said first and said second low power modes, operate said I/O communications, said memory and said control system to respond to and execute commands received at said I/O communications if said commands are executable without magnetic tape access;

analyze commands received by said I/O communications when said magnetic tape drive is in one of said low power modes;

if said received command relates to at least one of data stored on a magnetic tape cartridge, and to action requiring movement of a loaded magnetic tape, power on said magnetic tape drive to said full power mode;

if said received command relates to data stored in said memory, to storing data in said memory and results in data that may be stored in said memory being within the capacity of said memory, and to status of said magnetic tape drive; execute said at least one command without powering on the remainder of said magnetic tape drive; and if said received command relates to storing data in said memory and results in data that may be stored in said memory exceeding the capacity of said memory, power on said magnetic tape drive to said full power mode.

6. The magnetic tape drive of claim 5, wherein said control system is configured to, in said low power modes, power off portions of said control system that are used with or control functions of said magnetic tape drive that are powered off.

* * * * *